No. 835,537. PATENTED NOV. 13, 1906.
C. W. KEEN.
COMBINED ROTARY HARROW AND WEED CUTTER.
APPLICATION FILED JUNE 28, 1906.
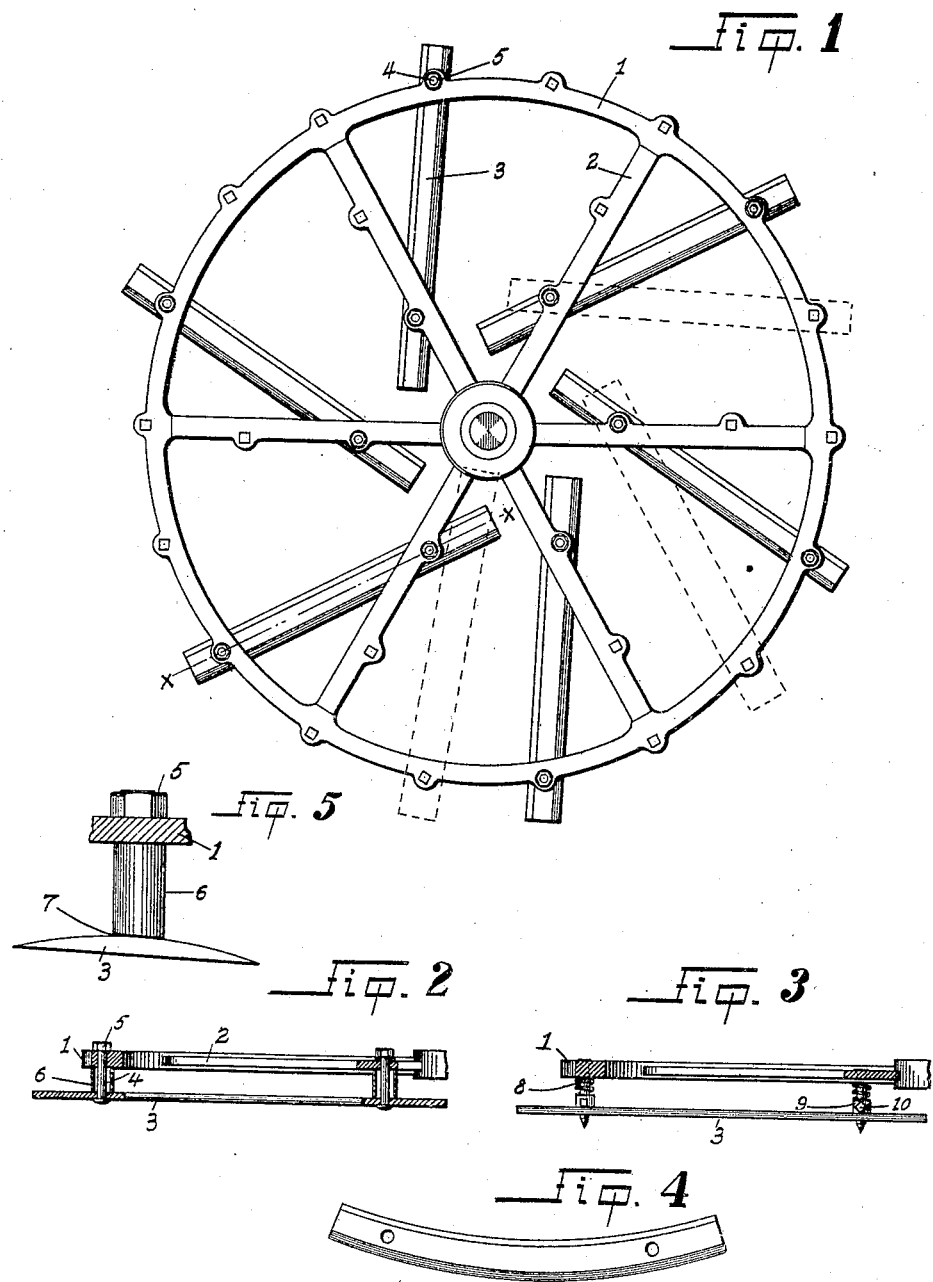

UNITED STATES PATENT OFFICE.

CAMDEN W. KEEN, OF LODI, CALIFORNIA.

COMBINED ROTARY HARROW AND WEED-CUTTER.

No. 835,537.      Specification of Letters Patent.      Patented Nov. 13, 1906.

Application filed June 28, 1906. Serial No. 323,830.

*To all whom it may concern:*

Be it known that I, CAMDEN W. KEEN, a citizen of the United States, and a resident of Lodi, in the county of San Joaquin and State of California, have invented certain new and useful Improvements in a Combined Rotary Harrow and Weed-Cutter; and I do declare the following to be a full, clear, and exact description of the invention, such as will enable others skilled in the art to which it appertains to make and use the same, reference being had to the accompanying drawings, and the characters of reference marked thereon, which form a part of this specification.

This invention relates to rotary harrows, my object being to produce a cutting attachment for the same, whereby the weeds may be cut as the harrow rotates, thus clearing the land for the better operation of the teeth of the harrow. This object I accomplish by attaching cutting-blades to the under side of the harrow in a manner and by such construction as will appear by a perusal of the following specification and claims.

In the drawings similar characters of reference indicate corresponding parts in the several views.

Figure 1 is a top plan view of the harrow-wheel. Fig. 2 is a fragmentary view showing the manner of attaching blades to the harrow. Fig. 3 is a modification of Fig. 2. Fig. 4 is a view of a curved bar. Fig. 5 is a view showing the mode of attaching the blades.

1 designates the wheel of the harrow provided width the usual spokes 2.

3 designates cutting-blades, sharp on both edges, secured to the wheel 1 in any position by means of bolts 4, provided with nuts 5. The said blades are held the desired distance away from the wheel by means of pipes or sleeves 6, encircling the bolts 4. The said sleeves are slightly beveled at their lower ends 7 for the purpose of having the side of the blade which is cutting extend slightly downward, as it cuts more readily thus than when on a straight line. A lever mechanism might also be involved for the regulation of the position of the said blades, if desired.

In practice the blades 3 may be secured in any desired position, as shown by dotted lines in Fig. 1, and may be also of any desired shape.

I have now entered into a detailed description of the construction of my invention, which shows I have provided a weed-cutting apparatus for rotary harrows, which is simple and effective. However, many small changes in the details of construction may be resorted to at will without departing from the spirit thereof. For instance, the said blades may be secured to a double rotary harrow or in any number of different positions, such as following the periphery of the rim of the wheel, &c., or the blades may be any shape, as convex, &c.

Having thus described my invention, what I claim as new and useful, and desire to secure by Letters Patent, is—

1. A rotary harrow, a cutting mechanism secured thereto and consisting of a series of cutting-blades secured obliquely to the spokes and rim of said harrow, as set forth.

2. A rotary harrow, a cutting mechanism arranged thereon consisting of cutting-blades secured to said harrow by means of bolts, sleeves bearing between the said blades and the under side of the said harrow, said sleeves being slightly beveled at their lower ends, as and for the purpose set forth.

3. A rotary harrow, a cutting mechanism arranged thereon consisting of cutting-blades secured to said harrow by means of bolts, and sleeves bearing between the said blades and the under side of said harrow and encircling said bolts, as set forth.

In testimony whereof I affix my signature in presence of two witnesses.

CAMDEN W. KEEN.

Witnesses:
     JOSHUA B. WEBSTER,
     PERCY S. WEBSTER.